United States Patent
Baudet

[19]

[11] Patent Number: 6,112,689

[45] Date of Patent: Sep. 5, 2000

[54] SAIL BODY AND METHOD FOR MAKING

[75] Inventor: Jean-Pierre Baudet, Emeryville, Calif.

[73] Assignee: Clear Image Concepts LLC, Alameda, Calif.

[21] Appl. No.: 09/340,276

[22] Filed: Jun. 25, 1999

[51] Int. Cl.[7] ...................................................... B63H 9/04
[52] U.S. Cl. .................................. 114/102.33; 114/102.31
[58] Field of Search ............................. 114/102.1, 102.29, 114/102.31, 102.33; 428/110, 111

[56] References Cited

U.S. PATENT DOCUMENTS

| | | |
|---|---|---|
| 2,565,219 | 8/1951 | Gardiner et al. . |
| 3,903,826 | 9/1975 | Andersen . |
| 3,954,076 | 5/1976 | Fracker . |
| 4,444,822 | 4/1984 | Doyle et al. . |
| 4,499,842 | 2/1985 | Mahr . |
| 4,554,205 | 11/1985 | Mahr . |
| 4,590,121 | 5/1986 | Mahr . |
| 4,593,639 | 6/1986 | Conrad . |
| 4,624,205 | 11/1986 | Conrad . |
| 4,679,519 | 7/1987 | Linville . |
| 4,708,080 | 11/1987 | Conrad . |
| 4,831,953 | 5/1989 | Conrad . |
| 4,945,848 | 8/1990 | Linville . |
| 5,001,003 | 3/1991 | Mahr . |
| 5,038,700 | 8/1991 | Conrad . |
| 5,097,783 | 3/1992 | Linville . |
| 5,097,784 | 3/1992 | Baudet . |
| 5,172,647 | 12/1992 | Towne . |
| 5,304,414 | 4/1994 | Bainbridge et al. . |
| 5,333,568 | 8/1994 | Meldner et al. . |
| 5,352,311 | 10/1994 | Quigley . |
| 5,355,820 | 10/1994 | Conrad et al. . |
| 5,403,641 | 4/1995 | Linville et al. . |
| 5,470,632 | 11/1995 | Meldner et al. . |

FOREIGN PATENT DOCUMENTS

| | | |
|---|---|---|
| 056 657 | 7/1982 | European Pat. Off. . |
| 224 729 | 6/1987 | European Pat. Off. . |
| 281 322 | 9/1988 | European Pat. Off. . |
| 29 26 476 | 6/1979 | Germany . |
| 31 19 734 | 5/1981 | Germany . |
| WO 87/07233 | 12/1987 | WIPO . |

OTHER PUBLICATIONS

J.L. Kardos, "Short–Fiber–Reinforced Polymeric composites, Structure–Porperty Relations," pp. 130–135.

"Consolidation Mechanisms and Interfacial Phenomena in Thermoplastic Powder Impregnated Composites," Section 2.2.1. Tow spreading unit, four pages.

Catalog No. 5, Tools and Hardware for Manufacturing Composite Parts and Laminates of All Types, Torr Technologies, Inc., Auburn, Washington.

*Primary Examiner*—Mark T. Le
*Assistant Examiner*—Patrick Craig Muldoon
*Attorney, Agent, or Firm*—Townsend and Townsend and Crew LLP

[57] ABSTRACT

A sail body (3) includes first and second skin layers (40, 42), each skin layer having an outer film (22) at an outer side (34) and reinforcement elements (28, 30) at an inner side (36). The skin layers are laminated with the inner sides abutting to form the sail body. The skin layers are each made up of skin components (38) joined to other skin components of the same skin layer another along their aligned edges (43). The joined edges (44) of the first skin layer are offset from the joined edges of the second skin layer to strengthen the sail body. The sail body is preferably a three-dimensional molded sail body. The fibers or other reinforcement elements are preferable generally aligned with the expected load lines (32) of the sail body.

22 Claims, 4 Drawing Sheets

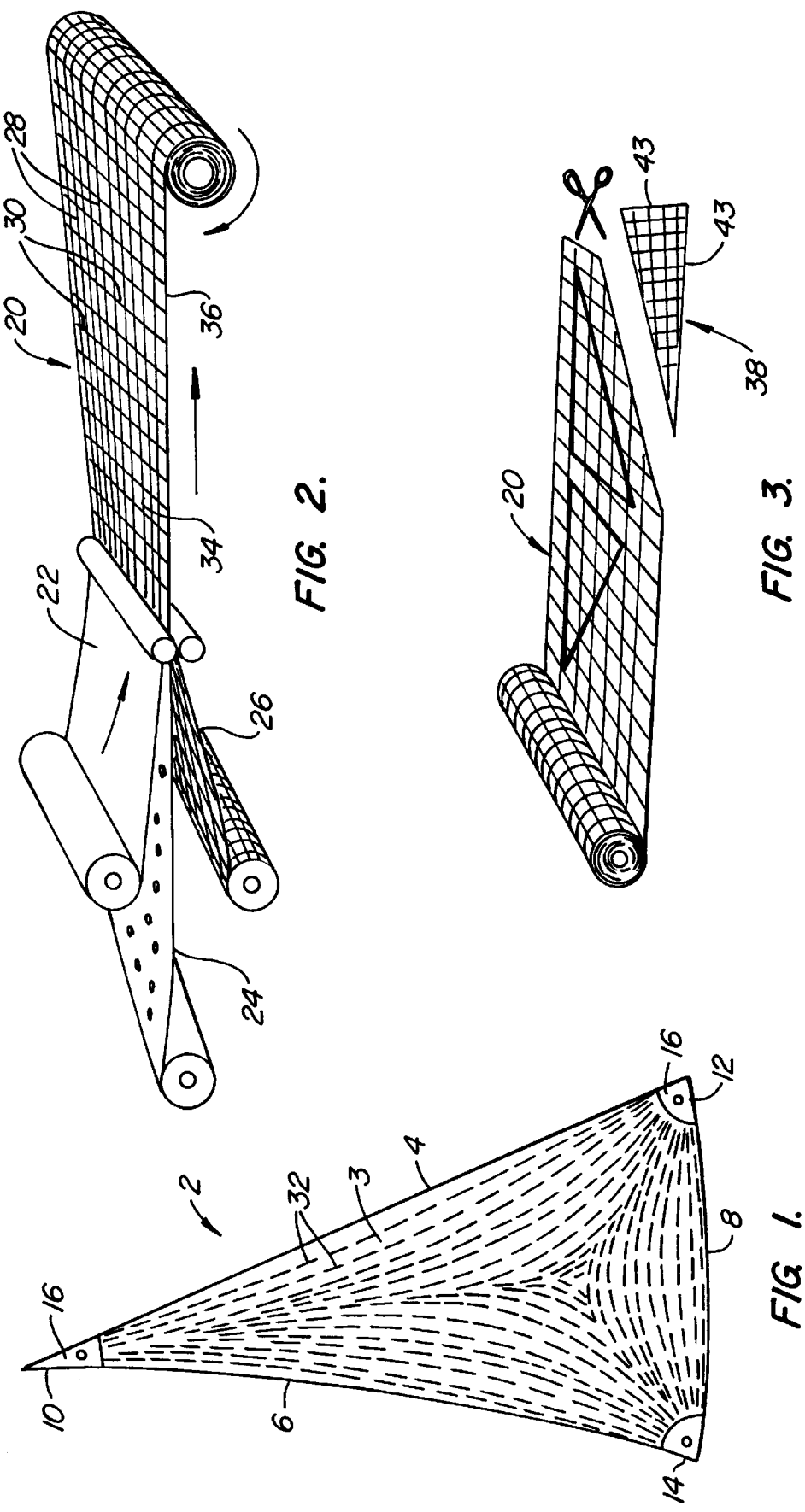

SAIL BODY AND METHOD FOR MAKING

BACKGROUND OF THE INVENTION

The present invention is directed to the field of sails, methods for their manufacture and apparatus used in their manufacture.

Sails can be flat, two-dimensional sails or three-dimensional sails. Most typically, three-dimensional sails are made by broadseaming a number of panels. The panels, each being a finished piece of sailcloth, are cut along a curve and assembled to other panels to create the three-dimensional aspect for the sail. The panels typically have a quadrilateral or triangular shape with a maximum width being limited traditionally by the width of the roll of finished sailcloth from which they are being cut. Typically the widths of the sailcloth rolls range between about 91.5 and 137 centimeters (36 and 58 inches).

Sail makers have many restraints and conditions placed on them. In addition to building products which will resist deterioration from weather and chafe abuses, a goal of modern sailmaking is to create a lightweight, flexible, three-dimensional air foil that will maintain its desired aerodynamic shape through a chosen wind range. A key factor in achieving this goal is stretch control of the airfoil. Stretch is to be avoided for two main reasons. First, it distorts the sail shape as the wind increases, making the sail deeper and moving the draft aft. This creates undesired drag as well as excessive heeling of the boat. Second, sail stretch wastes precious wind energy that should be transferred to the sailcraft through its rigging.

Over the years, sailmakers have attempted to control stretch and the resulting undesired distortion of the sail in three basic ways.

The first way sailmakers attempted to control sail stretch is by using low-stretch high modulus yarns in the making of the sailcloth. The specific tensile modulus in gr/denier is about 30 for cotton yarns (used in the 1940's), about 100 for Dacron® polyester yarns from DuPont(used in the 1950's to 1970's), about 900 for Kevlar® para-aramid yarns from DuPont (used in 1980's) and about 3000 for carbon yarns (used in 1990's).

The second basic way sailmakers have attempted to control sail stretch has involved better yarn alignment based on better understanding of stress distribution in the finished sail. Lighter and yet lower-stretch sails have been made by optimizing sailcloth weight and strength and working on yarn alignment to match more accurately the encountered stress intensities and their directions. The efforts have included both fill-oriented and warp-oriented sailcloths and individual yarns sandwiched between two films. With better understanding of the stress distribution, sailmaking has evolved towards more sophisticated panel-layout constructions. Up until the late 1970's, sails were principally made out of narrow panels of fill-oriented woven sailcloth arranged in cross-cut construction where the majority of the loads were crossing the seams and the width of the narrow panels. With the appearance of high-performance yarn material, like Kevlar, stretch of the numerous horizontal seams in the sails became a problem. To solve this and to better match the yarn alignment with the load patterns, an approach since the early 1980's has been to arrange and seam narrow panels of warp-oriented sailcloths in panel-layout constructions known as "Leech-cut" and later more successfully in the "Tri-radial" construction. The "Tri-radial" construction is typically broken into several sections made from narrow pre-assembled radiating panels. The highly loaded sections of the sail such as the clew, the head and the leech sections are typically made with radial panels cut from heavy sailcloth. The less loaded sail sections, such as the luff and the tack sections, are made with panels cut from lighter sailcloth. This approach, unfortunately, has its own drawbacks. Large sails made this way can have up to, for example, 120 narrow panels which must be cut and broadseamed to each other with great precision to form the several large sections. These large sections of pre-assembled panels are then joined together to form the sail. This is extremely time-consuming, and thus expensive, and any lack of precision often results in sail-shape irregularities. The mix of types of sailcloths used causes the different panels to shrink at different rates affecting the smoothness of the sail along the joining seams of the different sections, especially over time.

An approach to control sail-stretch has been to build a more traditional sail out of conventional woven fill-oriented sailcloth panels and to reinforce it externally by applying flat tapes on top of the panels following the anticipated load lines. See U.S. Pat. No. 4,593,639. While this approach is relatively inexpensive, it has its own drawbacks. The reinforcing tapes can shrink faster than the sailcloth between the tapes resulting in severe shape irregularities. The unsupported sailcloth between the tapes often bulges, affecting the design of the airfoil.

A further approach has been to manufacture narrow cross-cut panels of sailcloth having individual laid-up yarns following the load lines. The individual yarns are sandwiched between two films and are continuous within each panel. See U.S. Pat. No. 4,708,080 to Conrad. Because the individual radiating yarns are continuous within each panel, there is a fixed relationship between yarn trajectories and the yarn densities achieved. This makes it difficult to optimize yarn densities within each panel. Due to the limited width of the panels, the problem of having a large number of horizontal seams is inherent to this cross-cut approach. The narrow cross-cut panels of sailcloth made from individual spaced-apart radiating yarns are difficult to seam successfully; the stitching does not hold on the individual yarns. Even when the seams are secured together by adhesive to minimize the stitching, the proximity of horizontal seams to the highly loaded corners can be a source of seam, and thus sail, failure.

A still further approach has been to manufacture simultaneously the sailcloth and the sail in one piece on a convex mold using uninterrupted load-bearing yarns laminated between two films, the yarns following the anticipated load lines. See U.S. Pat. No. 5,097,784 to Baudet. While providing very light and low-stretch sails, this method has its own technical and economic drawbacks. The uninterrupted nature of every yarn makes it difficult to optimize yarn densities, especially at the sail corners. Also, the specialized nature of the equipment needed for each individual sail makes this a somewhat capital-intensive and thus expensive way to manufacture sails.

The third basic way sailmakers have controlled stretch and maintained proper sail shape has been to reduce the crimp or geometrical stretch of the yarn used in the sailcloths. Crimp is usually considered to be due to a serpentine path taken by a yarn in the sailcloth. In a weave, for instance, the fill and warp yarns are going up and down around each other. This prevents them from being straight and thus from initially fully resisting stretching. When the woven sailcloth is loaded, the yarns tend to straighten before they can begin resist stretching based on their tensile strength and resistance to elongation. Crimp therefore delays and reduces the stretch resistance of the yarns at the time of the loading of the sailcloth.

In an effort to eliminate the problems of this "weave-crimp", much work has been done to depart from using woven sailcloths. In most cases, woven sailcloths have been replaced by composite sailcloths, typically made up from individual laid-up (non-woven) load-bearing yarns sandwiched between two films of Mylar® polyester film from DuPont or some other suitable film. There are a number of patents in this area, such as Sparkman EP 0 224 729, Linville U.S. Pat. No. 4,679,519, Conrad U.S. Pat. No. 4,708,080, Linville U.S. Pat. No. 4,945,848, Baudet U.S. Pat. No. 5,097,784, Meldner U.S. Pat. No. 5,333,568, and Linville U.S. Pat. No. 5,403,641.

Crimp, however, is not limited to woven sailcloth and can occur with laid-up constructions also. Crimp in sailcloth made of laid-up yarn can be created in several different ways. First, lateral shrinkage of the films during many conventional lamination processes induces crimp into the yarns. For example, with narrow crosscut panel construction, where a majority of load-bearing yarns are crossing the panel widths, significant crimp of these yarns is induced during lamination of the sailcloth between high-pressure heated rolls. This is because the heated film shrinks laterally as it undergoes thermoforming, typically about 2.5% with this lamination method. The result is catastrophic with regard to the stretch performance for the composite fabric in highly loaded applications.

Second, uninterrupted load-bearing yarns within a sail follow curved trajectories. The yarns used are typically multifiber yarns. Twist is generally added so that the fibers work together and resist stretch along the curved trajectories. If no twist were added, only a few fibers would be submitted to the loads, that is the ones on the outside of the curve. This would substantially limit the ability of the sail to resist stretch. While the tiny yarn spirals created using the twisted multi-fiber yarns help increase load sharing amongst the fibers and therefore reduce stretch, there is still crimp induced as the spiraled yarns straighten under the loads. The twist in the yarns is therefore a necessary compromise for this design, preventing however this type of sailcloth from obtaining the maximum possible modulus from the yarns used.

The various approaches shown in Linville's patents are other attempts to reduce crimp problems. Layers of continuous parallel spaced-apart laid-up yarns are used to reinforce laminated sailcloth. However, because the continuous spaced-apart yarns are parallel to each other, only a small number of them are aligned with the loads. Panels cut out of these sailcloths therefore have poor shear resistance. In addition, no change of yarn density is achieved along the yarns direction. Therefore the proposed designs do not offer constant strain qualities. In addition, these approaches are designed to be used with panel-layout like the Cross-cut, Leech-cut and Tri-radial constructions, which result in their own sets of drawbacks.

The sailcloth shown in Meldner's patent may, in theory, reduce crimp problems. However, it is designed to be used in Tri-radial construction, which results in its own set of problems. Meldner laminates between two films continuous layers of unidirectional unitapes made from side-by-side pull-truded tows of filaments with diameters five times less than conventional yarns. The continuous unidirectional layers are crossing-over each other to increase filament-over-filament cross-over density, which is believed to minimize crimp problems and increase shear strength. Meldner is limited to the use of very small high performance yarns, which are expensive. The cost of those yarns affects greatly the economics of this approach and limits it to "Grand Prix" racing applications. In addition, this design of sailcloth is not intended to offer constant strain qualities; rather stretch and strength resistance are designed to be the same throughout the entire roll length of the sailcloth. Only a small number of the continuous unidirectional filaments end up aligned with the loads.

U.S. patebt application Ser. No. 09/173,917 filed Oct. 16, 1998 and entitled Composite Products, Methods and Apparatus, describes a low stretch, flexible composite particularly useful for making high performance sails. The composite includes first and second polymer films with discontinuous, stretch resistant segments therebetween. The segments extend generally along the expected load lines for the sail. The segments have lengths which are substantially shorter than the corresponding lengths of the load lines within each sail section. The sail can be either two-dimensional or three dimensional. The two-dimensional sails can be made from one section or a number of flat sections seamed together. Three dimensional sails can be made using one or more molded sections of the composite sheet or several flat sections can be broad seamed together to create the three dimensional sail. The sail can be designed to exhibit generally constant strain qualities under a desired use condition and to permit low stretch performance to be optimized by minimizing the crimp, that is the geometrical stretch, of the yarns.

SUMMARY OF THE INVENTION

The present invention is directed to a sail body and a method for making a sail body which is particularly useful for making molded sails while minimizing production steps and labor. The invention is especially well suited for sails for smaller boats, such as 14 to 35 foot (4.3 to 10.7 meter) boats, where encountered loads are may not be excessive and where constant strain characteristics may not be crucial.

A sail body made according to the invention includes first and second skin layers, each skin layer having an outer film at an outer side and reinforcement elements; the reinforcement elements may be at an inner side of the skin layer. The inner sides of the first and second skin layers abut one another; the skin layers are laminated to one another at their inner sides to form the sail body. The skin layers are each made up of skin components joined to other skin components of the same skin layer along their edges. The joined edges of the first skin layer are offset from the joined edges of the second skin layer to strengthen the sail body.

The sail body may be a two-dimensional or a three-dimensional sail body. The fibers or other reinforcement elements are preferable generally aligned with the expected load lines of the sail body.

Another aspect of the invention is a method for making a sail body in which sets of first and second skin components are created. The set of first skin components are joined along their edges to create a first skin layer and the set of second skin components are joined along their edges to create a second skin layer. Each skin layer has an outer film and at an outer side and preferably has reinforcement elements at an inner side. The first and second skin layers are adhered to one another with the inner sides abutting to create a sail body. The joined edges of the first and second skin layers are offset so that reinforcement elements of the first and second skin layers cross over the joined edges of the second and first skin layers, respectively.

The joining steps are preferably carried out by temporarily securing the first and second skin components along their respective joined edges to permit shifting of the skin components during the adhering step. This facilitates manufacture of three-dimensional molded sails.

Other features and advantages of the invention will appear from the following description in which the preferred embodiments have been set forth in detail in conjunction with the accompanying drawings.

BRIEF DESCRIPTION OF THE DRAWINGS

FIG. 1 is a plan view of a sail made according to the present invention with an exemplary set of expected load lines shown in dashed lines;

FIG. 2 schematically illustrates manufacture of reinforced film;

FIG. 3 illustrates cutting skin components from the reinforced film of FIG. 2;

DESCRIPTION OF THE SPECIFIC EMBODIMENTS

Figure 4A:
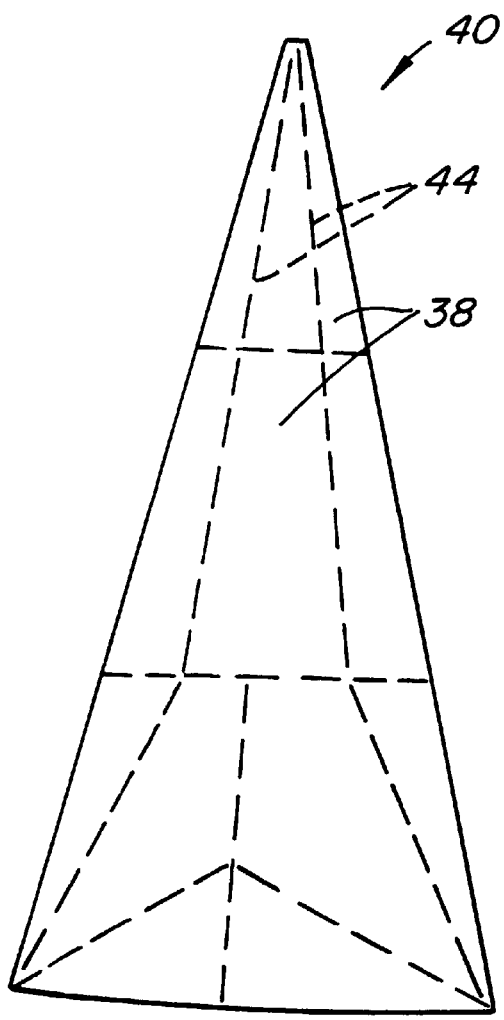
FIG. 4A illustrates a first skin layer created by temporarily joining a set of appropriately shaped first skin components along their adjacent edges.
Figure 4B:
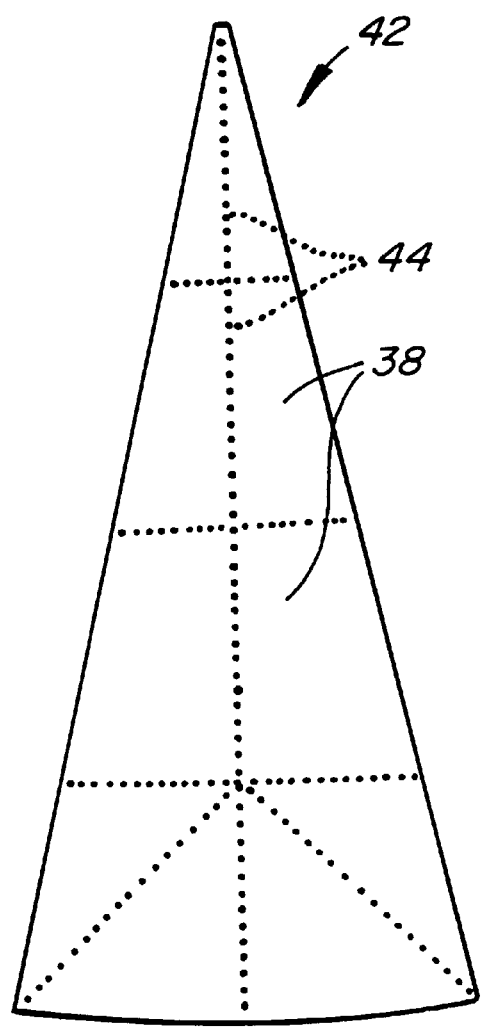
FIG. 4B illustrates a second skin layer made of a set of second skin components joined along their adjacent edges.

FIG. 1 illustrates a sail 2 made according to the invention. In this embodiment sail 2 includes a sail body 3 and has three edges, luff 4, leech 6 and foot 8. Sail 2 also has three corners, head 10 at the top, tack 12 at the lower forward corner of the sail at the intersection of luff 4 and foot 8, and clew 14 a the lower aft corner of the sail at the intersection of the leech and the foot. While sail 2 is typically a molded, generally triangular, three-dimensional sail, it could also be a two-dimensional sail and could have any of a variety of shapes. The finished sail 2 includes gussets 16 at head 10, tack 12 and clew 14 and selvage 18 along luff 4, leech 6 and foot 8 to create the finished sail. A process suitable for making sail body 3 and its construction will now be discussed.

FIG. 2 illustrates making an uncured reinforced film 20 from an imperforate film 22, typically made of PET or polyester film, an uncured adhesive web 24, such as a copolyester resin, or and a mesh or scrim of fibers or other reinforcement elements 26. Film 22 could be made from other materials, such as Kapton® polyimide film made by DuPont. The mesh or scrim will typically be unwoven but may be woven for increased tear resistance. Mesh or scrim 26 preferably includes a set of first reinforcement elements 28 which run parallel to one another along the length of film 20 and a set of second, generally parallel reinforcement elements 30 which are arranged transversely to, typically perpendicular to, reinforcement elements 28. Reinforcement elements 28, 30 can be made from a variety of materials such as monofilament material, multifiber yarns made of, for example, carbon fiber, aramid fiber, polyester fiber or fiber sold under the trademarks PBO®, Pentex® or Spectra®. Reinforcement elements may be, for example, cylindrical or flattened in cross-section and may be made of twisted or untwisted fibers. Reinforcement elements 28 are typically, but need not be, the fibers used to be generally aligned with the expected load lines 32 of sail 2.

In one embodiment, first and second reinforcement elements 28, 30 are made of 500 denier untwisted multifiber yarns and twisted multifiber yarns, respectively. Second reinforcement elements 30 are preferably twisted multifiber yarns for increased tear resistance. The spacing between first reinforcement elements 28 is about 3 mm and the spacing between second reinforcements elements is about 10 mm. However, the first and second reinforcement elements 28, 30 could be made of different materials and could be made with the same or different diameters. Also, the reinforcement elements could have equal or unequal lateral spacing as well. The choice of reinforcement elements 28, 30, their orientation and their spacing will be determined in large part by the expected loading of sail 2.

Reinforced film 20 has an outer, film side 34 and inner, reinforcement side 36. Film 20 is cut into skin components 38 of various shapes and sizes as suggested in FIG. 3. Skin components 38 are joined together to create the first and second skin layers 40, 42. First and second skin layers 40, 42 are each created by temporarily securing the aligned edges 43 of the skin components 38 to create joined edges 44. This is typically achieved by slightly overlapping aligned edges 43 and heat tacking the edges together at spaced-apart positions along the overlapped, aligned edges 43. Alternatively, aligned edges 43 could be placed to create butt joints which would be temporarily secured using heat-sensitive tape.

Figure 4C:
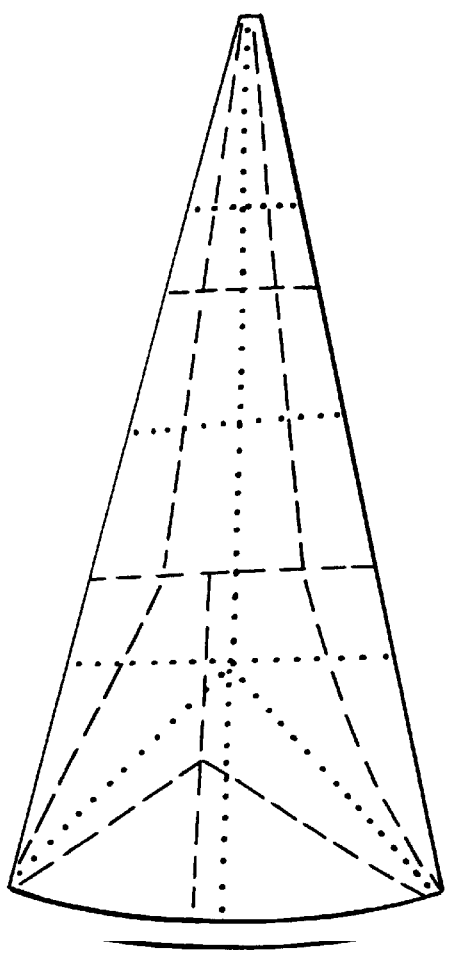
FIG. 4C illustrates how the joined edges of the first and second skin layers of FIGS. 4A and 4B are offset when the skin layers are placed one on top of the other.

In comparing first and second skin layers 40, 42 it is noted that joined edges 44 of first skin layer 40 are not aligned with but are offset from joined edges 44A of second skin layer 42. This is illustrated in FIG. 4C in which first and second skin layers 40, 42 are overlayed on one another with joined edges 44, 44A offset. This is very important because it permits reinforcement elements 28, 30 from one skin layer 40, 42 to cross over joined edges 44A, 44 of the other skin layer 42, 40 so that when the first and second skin layers are joined to create sail body 3, any weakness created at joined edges 44, 44A are effectively dealt with.

Figure 5:
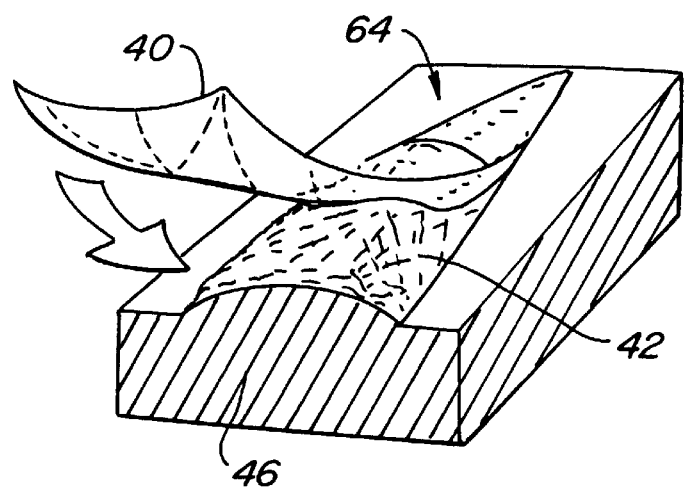
FIG. 5 suggests placing the second skin layer on top of the first skin layer, the first skin layer on a flexible pressure sheet, the flexible pressure sheet supported by a convex mold element.

FIG. 5 suggests placing second skin layer 44A on top of first skin layer 44, the first skin layer being supported by a convex mold element 46, to create a material stack 64. Various methods of laminating or otherwise joining material stack 64 of skin layers 44, 44A can be used, such as molding between positive and negative dies or using a single positive or negative die and forcing the skin layers together using, for example, hot sand, to supply heat and pressure. The temporary securement of edges 44 permits skin components 38 to shift somewhat during lamination to create the desired three-dimensional sail body 3 shown in FIG. 7. A preferred method is described below with reference to FIGS. 6, 6A and 6B.

Figure 6:
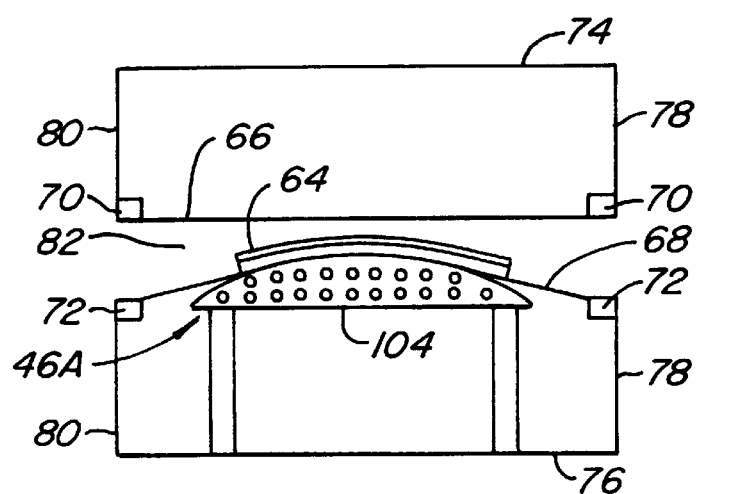
FIG. 6 is a simplified end view illustrating placement of the stack of skin layers between two high-friction, flexible pressure sheets stretched between frames, the frames carried by upper and lower enclosure members, with a three-dimensional mold element used to create a molded sail body.
Figure 6A:
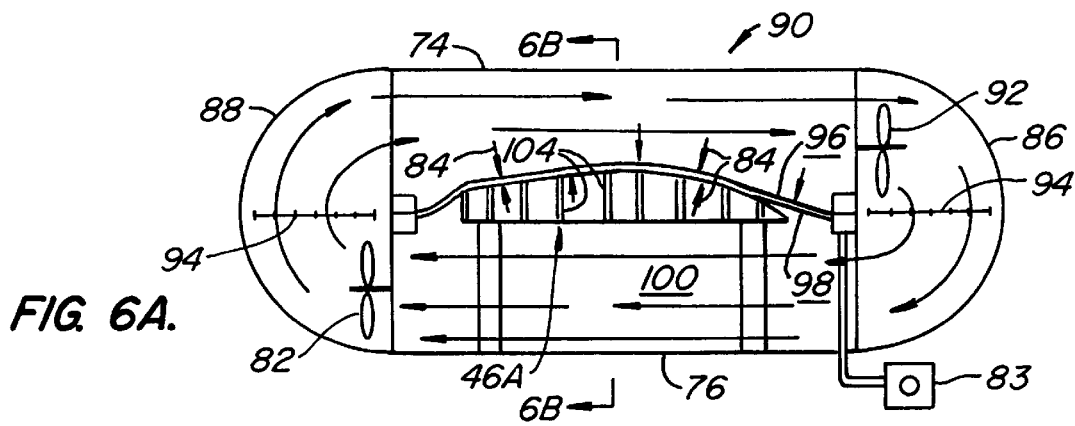
FIG. 6A shows the structure of FIG. 6 after the upper and lower enclosure members have been brought together, capturing the stack of material within a lamination interior between the flexible pressure sheets, and placement of first and second end enclosure members adjacent to the open ends of the closed upper and lower enclosure members, each including a recirculating fan and an electric heater element so to cause heated, circulating fluid to pass by the outer surfaces of the flexible pressure sheets, and then application of pressure to the outer surfaces of the flexible pressure sheets by creating a partial vacuum within the lamination interior.
Figure 6B:
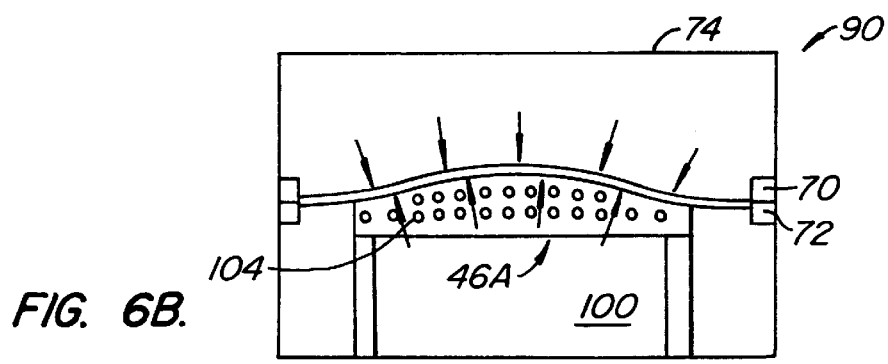
FIG. 6B is a simplified view taken along line 6B—6B of FIG. 6A.
Figure 7:
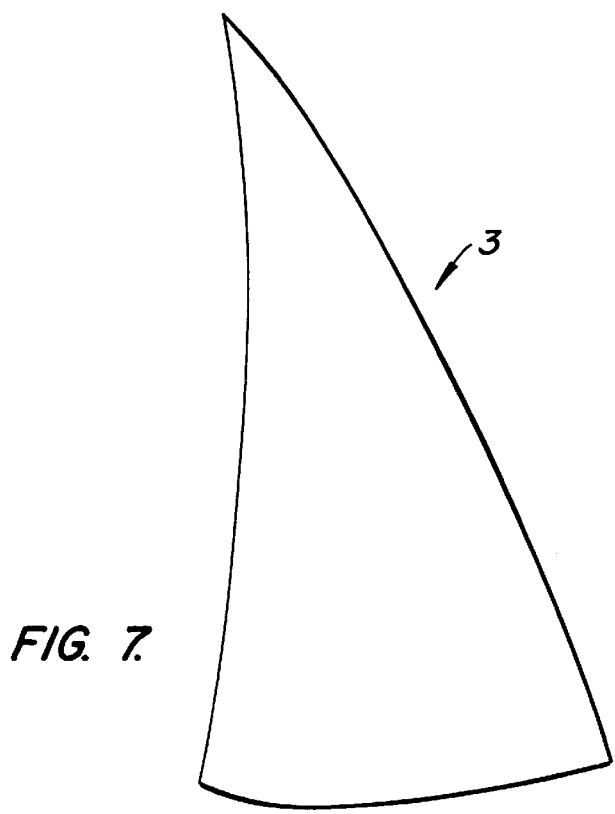
FIG. 7 illustrates a molded sail body taken from the three-dimensional mold of FIG. 6.

Material stack 64 is positioned between upper and lower flexible pressure sheets 66, 68 as shown in FIG. 6. Pressure sheets 66, 68 are preferably made of a flexible, elastomeric material, such as silicone, which provides high-friction surfaces touching outer film sides 34 of material stack 64. Upper and lower flexible pressure sheets 66, 68 are circumscribed by upper and lower rectangular frames 70, 72. Frames 70, 72 are mounted to upper and lower enclosure members 74, 76. Each enclosure member 74, 76 is a generally three-sided enclosure member with open ends 78, 80. Upper and lower enclosure members 74, 76 carrying frames 70, 72 and flexible pressure sheets 66, 68 therewith, are then brought together as shown in FIG. 6A. A partial vacuum is then created within a lamination interior 82 formed between sheets 66, 68 using vacuum pump 83, thus creating a positive lamination pressure suggested by arrows 84 in FIG. 6A. First and second end enclosure members 86, 88 are then mounted over the open ends 78, 80 of upper and lower enclosure member 74, 76 to create a sealed enclosure 90.

First and second end enclosure members 86, 88 each include a fan 92 and an electric heater element 94. Fans 92 cause air or other fluids, such as oil, within enclosure 90 to be circulated around and over the outer surfaces 96, 98 of flexible pressure sheets 66, 68. This ensures that flexible pressure sheets 66, 68 and material stack 64 therebetween are quickly and uniformly heated from both sides. Because the entire outer surfaces 96, 98 can be heated in this way, the entire material stack 64 is heated during the entire lamination process. This helps to ensure proper lamination. The high-friction nature of sheets 66, 68 secures first and second skin layers 40, 42 in place, while allowing some shifting of skin components 38, and prevents any substantial shrinkage of the skin layers during lamination. Any shrinkage which does occur should occur in all directions to minimize any resulting crimp in any fibrous segments. After a sufficient heating period, the interior 100 of enclosure 90 can be vented to the atmosphere and cooled with or without the use of fans 92 or additional fans. After being properly cooled, sail body 3 is removed from between pressure sheets 66, 68; see FIG. 7. Sail body 3 is finished in customary ways to create sail 2.

FIGS. 6, 6A and illustrate the perforated nature of mold element 46A contacting outer surface 98 of lower flexible pressure sheet 68. In the preferred embodiment, perforated mold element 46A is made up of a number of relatively thin vertically-oriented members 104 oriented parallel to one another with substantial gaps therebetween to permit the relatively free access to the heated fluid to lower surface 98. Preferably, no more than about 20%, and more preferably no more than about 5%, of that portion of lower surface 98 which is coextensive with material stack 64 is covered or effectively obstructed by perforated mold element 46A. Instead of vertically-oriented members 104, perforated mold element 46A could be made of, for example, honeycomb with vertically-oriented openings. Many dead spaces could be created within the vertically-extending honeycomb channels, thus substantially hindering heat flow to large portions of lower surface 98. This can be remedied by, for example, changing the air flow direction so the air is directed into the honeycomb channels, minimizing the height of the honeycomb, and providing air flow escape channels in the honeycomb near surface 98. Other shapes and configurations for perforated mold element 46A can also be used.

Preferably the heated fluid within interior 100, which may be a gas or a liquid, is in direct thermal contact with upper and lower surfaces 96, 98. However, in some circumstances an interposing surface could be created between the heated fluid and surfaces 96, 98. So long as such interposing surfaces do not create a significant heat barrier, the heated fluid will remain in effective thermal contact with outer surfaces 96, 98 of pressure sheets 66, 68.

Modification and variation can be made to the disclosed embodiments without departing from the subject of the invention defined by the following claims. For example, first and second skin layers 40, 42 may be made of the same or different materials. One or both films 22 may not be imperforate. First and second skin layers 40, 42 are congruent—they have the same shape and size; they could be of slightly different sizes (such as to permit the peripheral edge of one to be folded over the peripheral edge of the other during finishing operations) and yet be effectively congruent.

Any and all patents, patent applications and printed publications referred to above are incorporated by reference.

What is claimed is:

1. A sail body comprising:

first and second skin layers, each said skin layer comprising an outer side an inner side, an outer film at the outer side and reinforcement elements, said inner sides abutting, said skin layers laminated to one another to form a sail body;

said first and second skin layers each comprising skin components, said skin components each comprising edges, said skin components of said first skin layer joined to one another along their edges to create joined edges, and said skin components of said second skin layer joined to one another along their edges to create joined edges; and the joined edges of said first skin layer being offset from the joined edges of said second skin layer so that reinforcement elements of the first and second skin layers cross over the joined edges of the second and first skin layers, respectively.

2. The sail body according to claim 1 wherein said sail body is a molded sail body with a three-dimensional contour.

3. The sail body according to claim 1 wherein said outer film of at least one said skin layer is imperforate.

4. The sail body according to claim 1 wherein said outer films are made of the same film material.

5. The sail body according to claim 1 wherein said reinforcement elements of at least one said skin component comprise a first set of generally parallel reinforcement elements.

6. The sail body according to claim 1 wherein said reinforcement elements of said at least one said skin component comprises a second set of generally parallel reinforcement elements oriented transversely to said first set of generally parallel reinforcement elements.

7. The sail body according to claim 1 wherein said sail body has expected load lines and said first set of generally parallel reinforcement elements are generally aligned with said expected load lines.

8. The sail body according to claim 1 wherein said reinforcement elements comprise twisted and untwisted multifiber yarns.

9. The sail body according to claim 1 wherein said reinforcement elements are at the inner side.

10. The sail body according to claim 1 wherein said reinforcement elements comprise fiberous scrim.

11. The sail body according to claim 10 wherein said scrim is a woven scrim.

12. A sail body comprising:

first and second skin layers, each said skin layer comprising an outer film at an outer, film side and reinforcement elements at an inner, reinforcement side, said reinforcement sides abutting, said skin layers adhered to one another to form a molded sail body with a three-dimensional contour;

said first and second skin layers each comprising skin components having edges, the skin components of the first skin layer joined to one another along their edges to create joined edges, the skin components of the second skin layer joined to one another along their edges to create joined edges;

said outer film of at least one said skin layer being imperforate;

said reinforcement elements of at least one said skin component comprising a first set of generally parallel reinforcement elements and a second set of generally parallel reinforcement elements oriented transversely to said first set of generally parallel reinforcement elements;

said sail body having expected load lines, said first set of generally parallel reinforcement elements being generally aligned with said expected load lines; and the joined edges of said first skin layer being offset from the joined edges of said second skin layer.

13. A method for making a sail body comprising:

creating a set of first skin components and a set of second skin components, said skin components each having edges;

joining the set of first skin components along edges thereof to create a first skin layer with joined edges;

joining the set of second skin components along edges thereof to create a second skin layer with joined edges, each said skin layer comprising an outer side, and inner side, an outer film at the outer side, and reinforcement elements;

laminating said first and second skin layers with the inner sides abutting to create a sail body; and offsetting, prior to the laminating step, the joined edges of the first and second skin layers of the sail body so that reinforcement elements of the first and second skin layers cross over the joined edges of the second and first skin layers, respectively.

14. The method according to claim 13 wherein the skin components creating step comprises:

obtaining reinforced film made from a length of film, a reinforcement web and an uncured adhesive; and severing the reinforced film to create the sets of first and second skin components.

15. The method according to claim 13 wherein said joining steps are carried out by temporarily securing said sets of first and second skin components along their respective joined edges to permit shifting of the skin components during said adhering step.

16. The method according to claim 15 wherein said laminating step is carried out using heat and pressure.

17. The method according to claim 16 wherein said laminating step is carried out using a three-dimensional mold to create a three-dimensional sail body.

18. The method according to claim 13 wherein said offsetting step is carried out in the creating and joining steps in which the first and second skin layers are effectively congruent.

19. The method according to claim 13 wherein the creating step is carried out by severing a reinforced film to create the sets of first and second skin components, the first and second skin components each comprising generally parallel first reinforcement elements.

20. The method according to claim 19 further comprising determining a set of expected load lines for the sail body and generally aligning the first reinforcement elements with the expected load lines.

21. The method according to claim 20 wherein the creating step is carried out using a reinforced film comprising second reinforcement elements oriented transverse to the first reinforced elements.

22. A method for making a sail body comprising:

forming reinforced film by laminating a length of film, a web of reinforcement elements and an uncured adhesive;

severing the reinforced film to create sets of first and second skin components, the skin components each having edges;

joining the set of first skin components along their edges to create a first skin layer with joined edges;

joining the set of second skin components along their edges to create a second skin layer with joined edges, each said skin layer comprising an outer side, an inner side, an outer film at the outer side, and reinforcement elements at the inner side;

laminating said first and second skin layers in a three-dimensional mold using heat and pressure with the inner sides abutting to create a three-dimensional sail body;

said joining steps being carried out by temporarily securing said sets of first and second skin components along their respective edges to permit shifting of the skin components during said laminating step; and offsetting, prior to the adhering step, the joined edges of the first and second skin layers of the sail body so that reinforcement elements of the first and second skin layers cross over the joined edges of the second and first skin layers, respectively.

\* \* \* \* \*